United States Patent [19]
Allen

[11] Patent Number: 5,761,463
[45] Date of Patent: Jun. 2, 1998

[54] METHOD AND APPARATUS FOR LOGIC NETWORK INTERFACING WITH AUTOMATIC RECEIVER NODE AND TRANSMIT NODE SELECTION CAPABILITY

[75] Inventor: Charles M. Allen, Sunnyvale, Calif.

[73] Assignee: Maxim Integrated Products, Sunnyvale, Calif.

[21] Appl. No.: 808,193

[22] Filed: Feb. 28, 1997

Related U.S. Application Data

[63] Continuation of Ser. No. 365,355, Dec. 28, 1994, abandoned.

[51] Int. Cl.[6] .................................................. G06F 13/00
[52] U.S. Cl. .......................... 395/309; 395/282; 395/283; 395/284; 395/830
[58] Field of Search ........................ 395/200.02, 200.1, 395/200.2, 282, 283, 830, 838, 309, 200.5, 200.8, 200.48, 200.55, 280, 281, 284, 821

[56] References Cited

U.S. PATENT DOCUMENTS

| | | |
|---|---|---|
| 3,956,589 | 5/1976 | Weathers et al. .................. 370/296 |
| 4,346,440 | 8/1982 | Kyu et al. ............................ 395/200.66 |
| 4,926,442 | 5/1990 | Bukowski et al. .................. 375/317 |
| 4,964,124 | 10/1990 | Burnett ............................... 395/183.2 |
| 5,194,758 | 3/1993 | Ver Meer ............................. 307/112 |
| 5,247,540 | 9/1993 | Hoge ..................................... 375/220 |
| 5,267,069 | 11/1993 | Griffin et al. ........................ 359/135 |
| 5,414,712 | 5/1995 | Kaplan et al. ...................... 371/20.1 |
| 5,491,830 | 2/1996 | Ferri ..................................... 395/830 |

*Primary Examiner*—Jack B. Harvey
*Assistant Examiner*—Ario Etienne
*Attorney, Agent, or Firm*—Blakely, Sokoloff, Taylor & Zafman LLP

[57] ABSTRACT

A method and apparatus for providing serial interface capability that detects whether another communications system transmits or receives data on a particular node, and in response, automatically selects to either receive or transmit data on that node. An interface circuit is included that determines whether a particular node is coupled to a receiver circuit or a driver circuit based on the voltage level detected on that node. Based on this determination, the interface circuit is configured to either transmit or receive data on that node. This allows the interface circuit to interact with differently configured communications systems without the need for special cables, or for user intervention.

44 Claims, 4 Drawing Sheets

METHOD AND APPARATUS FOR LOGIC NETWORK INTERFACING WITH AUTOMATIC RECEIVER NODE AND TRANSMIT NODE SELECTION CAPABILITY

This is a continuation of application Ser. No. 08/365,355, filed Dec. 28, 1994, now abandoned.

BACKGROUND OF THE INVENTION

1. Field of the Invention

The described invention relates generally to the field of computer communications. More particularly, the invention relates to a method and apparatus for digital communications that detects whether another communications system transmits or receives data on a particular node and which automatically switches to either receive or to transmit data on that node in response.

2. Related Art

Various methods for transmitting and receiving data between two communications systems over a serial line interface are known. One example of such an interface is the RS-232 serial communications standard that allows communications systems such as modems, printers, or computer systems to exchange data over multiple unidirectional signal lines. Normally, an RS-232 communications link is formed between the Data Terminal Equipment ("DTE") at one end of a network connection, and the Data Communications Equipment ("DCE") at the other end. The DTE sends data to the DCE on certain signal lines such as the transmit data line ("TD"), and the DCE sends data to the DTE on other signal lines such as the receive data line ("RD"). A typical example of a DTE is a personal computer and a typical example of a DCE is a modem.

A cable configured in accordance with the RS-232 standard usually incorporates a cable connector at each end of the cable, each connector having a set of pins. The various signals that make-up the RS-232 interface are transmitted through specific pins within the cable connector. For example, the transmit data (TD) signal is transmitted through pin 3 in the cable connector and the receive data (RD) signal is transmitted through pin 2. Since a DTE transmits signals over the TD line and receives signals over the RD line, any serial line interface circuit it uses will have a driver circuit connected to pin 3 of the cable connector and a receiver circuit connected to pin 2. Conversely, since a DCE system receives the TD signal and drives the RD signal, it will have a receiver circuit connected to pin 3 and a driver circuit connected to pin 2. This allows a DTE and a DCE to communicate via the RS-232 interface with an interface cable that joins the cable connectors at either end in a simple, direct, pin-to-pin manner. In other words, pin 1 of the cable connector at one end is connected to pin 1 of the cable connector at the other end.

However, a problem exists if two personal computer systems are to communicate via the RS-232 communications interface standard using a cable configured with simple pin-to-pin connections. Since both communications systems are DTEs, they each transmit information on the same pin, and therefore are unable to communicate directly with each other. Conventional approaches to this problem involve the use of a special cable which couples pin 2 of one system to pin 3 of the other system, and vice versa, such that the transmission circuit of one DTE is coupled to the receiving circuit of the other. Such a cable is often referred to as a "null modem" cable. An alternate approach involves the use of various interface circuits which incorporate switching circuitry for configuring the interface circuit as either a DTE or a DCE. However, these interface circuits require the user or the system designer to actively switch the interface circuit if a change in configuration is required. Requiring the user to select the proper configuration of an interface circuit or to select an interface cable is, however, an inconvenience, which may also introduce error and delay.

Accordingly, there is a need in the technology for a system which allows a DTE device to communicate with either a DCE device or another DTE device using a single cable, without any user intervention. It is therefore desirable to provide a circuit that can detect whether another communications system transmits or receives data on a particular node, and which automatically selects to receive or transmit data on that node in response.

BRIEF SUMMARY OF THE INVENTION

The described invention is a method and apparatus for providing serial interface capability by detecting whether another communications system transmits or receives data on a particular node and which automatically switches to either receive or to transmit data on that node in response. An interface circuit determines whether a particular node is coupled to a receiver circuit or a driver circuit based on the voltage level detected on that node. Based on this determination, the interface circuit is configured to either transmit or receive data on that node. This allows the interface circuit to interact with differently configured communications systems without the need for user intervention.

BRIEF DESCRIPTION OF THE DRAWINGS

The objects, features and advantages of the present invention will become apparent from the following detailed description of the present invention in which.

DETAILED DESCRIPTION OF THE INVENTION

In the following description, the invention is set forth within the context of an interface circuit configured in accordance with the RS-232 interface standard including the signals and voltage levels specified by that standard.

Figure 1:
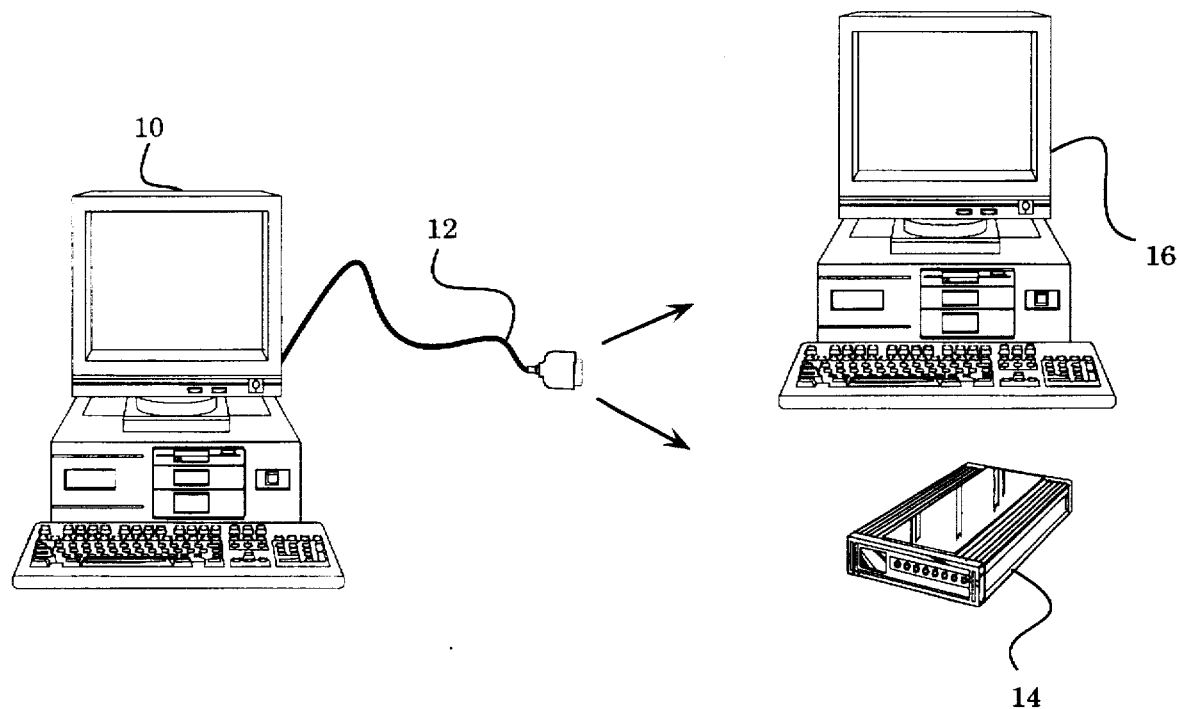
FIG. 1 depicts a computer system that can be connected to a modem or another computer system using the same cable in accordance with the described invention.

FIG. 1 depicts a computer system 10 that may be coupled to either a modem or another computer system using the same cable in accordance with a preferred embodiment of the invention. Computer system 16 is a DTE communications system that transmits data over a first line in cable 12 and receives data over a second line in cable 12. Modem 14 is a DCE communications system that receives data on the first line in cable 12 and transmits data on the second line. Computer system 10 is configured in accordance with one embodiment of the present invention and has an interface circuit (shown in FIGS. 2a, 3 and 4) that allows it to transmit data over the first signal line and receive data over the second signal when cable 12 is coupled to computer system 16, and to receive data over the first signal line and transmit data over the second signal line when cable 12 is coupled to modem 14. This allows computer system 10 to communicate with either computer system 16 or modem 14 by using a single cable.

Figure 2A:
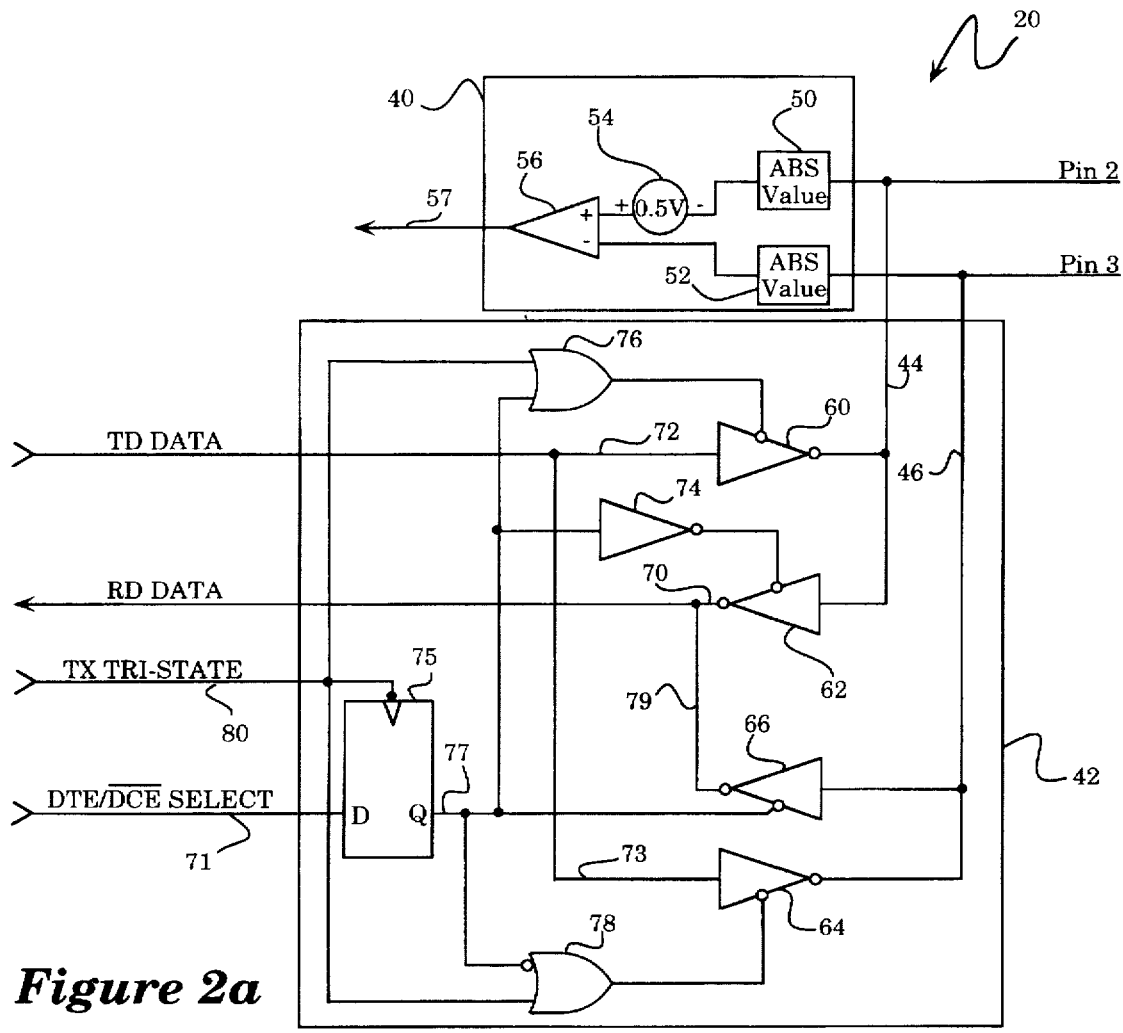
FIG. 2a depicts a circuit diagram of an interface circuit configured in accordance with a first embodiment of the invention.

FIG. 2a is a circuit diagram of the interface circuit used by computer system 10 when configured in accordance with a first embodiment of the invention. The interface circuit 20 comprises a DTE/DCE detection circuit 40 and a driver/receiver circuit 42. DTE/DCE detection circuit 40 determines whether the interface circuit 20 is coupled to a DTE or a DCE system and asserts a signal on DTE/ DCE detection line 57 in response. Driver/receiver circuit 42 is controlled by DTE/DCE selection line 71 and TX tri-state line 80. Driver/receiver circuit 42 can either transmit signals on line 44 and receive signals on line 46, or receive signals on line 44 and transmit signals on line 46.

DTE/DCE detection circuit 40 comprises two absolute value circuits 50, 52, a voltage source 54 and a voltage comparator 56. Absolute value circuits 50 and 52 are respectively coupled to pin 2 and pin 3 of an RS-232-compatible connector placed at one end of cable 12 of FIG. 1. Such cable connectors are well known in the art. Absolute value circuits 50 and 52 each receive an input voltage level of a certain magnitude that can either be greater than or less than ground, and each return a voltage level that is greater than ground of the same magnitude. The output voltage from absolute value circuit 50 is applied to the noninverting input of voltage comparator 56 after being transmitted through 0.5 volt voltage source 54. The output of absolute value circuit 52 is applied directly to the inverting input of voltage comparator 56. The voltage comparator 56 provides an output on line 57.

The RS-232 interface standard specifies that the receiving input of a RS-232 compatible system will experience a 4.7 kiloohm resistor coupled to ground, or an applied voltage level of between +2.0 to −2.0 volts, although the latter is uncommon in practice. Thus, by providing a signal which changes its state depending on whether pin 2 or 3 is at the higher absolute voltage level, DTE/DCE detection circuit 40 indicates which pin is presently being driven, and therefore, whether the other communications system to which it is coupled is a DTE or DCE communications system.

As communications are first being established between computer system 10 and another communications system, voltage comparator 56 senses the voltage levels generated by absolute value circuits 50 and 52 in response to the voltage levels detected on pins 2 and 3. When the voltage level generated from absolute value circuit 50 plus the 0.5 volts supplied by voltage source 54 exceeds the voltage level generated by absolute value circuit 52, voltage comparator 56 will assert a logic high on line 57, indicating that pin 2 is being driven by a DCE system. If, however, the voltage level generated by absolute value circuit 52 exceeds the voltage level generated by absolute value circuit 50 plus the 0.5 volts supplied by voltage source 54, voltage comparator 56 will assert a logic low on line 57, indicating that pin 3 is being driven by a DTE device. The signal provided on signal line 57 can be used by the computer system 10 to configure itself to receive or transmit data in accordance to whether it is coupled to a DTE or DCE, respectively. This will be discussed in detail in the following sections.

The RS-232 interface standard specifies that valid logic levels only include voltage levels less than −3.0 volts and greater than +3.0 volts. Therefore, any pin coupled to the driver output of an RS-232 communications system will experience a voltage level with an absolute value of at least 3.0 volts.

With reference to FIG. 2a, driver/receiver circuit 42 comprises two driver circuits 60, 64, two receiver circuits 62, 66, an inverter 74, a flip-flop 75 and two OR gates 76, 78. Driver circuits 60, 64, receive data for transmission via Transmit Data (TD) lines 72 and 73, respectively. Data received via pins 2 and 3 are provided to receiver circuits 62, 66 via lines 44 and 46, respectively. The receiver circuits 62, 66 provide the received data to the computer system 10 via Receive Data (RD) lines 70, 79. TD lines 72, 73 and RD lines 70, 79 are provided to an Universal Asynchronous Receiver/Transmitter (UART) circuit within the computer system 10. The output of driver circuit 60 and the input of receiver circuit 62 are each coupled to pin 2 of the RS-232 compatible circuit connector, and the output of driver circuit 64 and the input of receiver circuit 66 are each coupled to pin 3. DTE/DCE select control line 71 is applied to the input of flip-flop 75. The output 77 of flip-flop 75 is applied to the enable line of receiver circuit 66 and to the enable line of receiver circuit 62 via inverter 74. Additionally, the output 77 of the flip-flop 75 is applied to the enable input of driver circuit 60 and 64 via OR gates 76 and 78 respectively. The tri-state line 80 is also applied to the inputs of OR gates 76 and 78, and to the negative-edge-triggered clock input of flip-flop 75.

DTE/DCE select control line 71 and TX tri-state line 80 are used to configure driver/receiver circuit 42. To configure driver/receiver circuit 42 to receive signals on pin 3 and to transmit signals on pin 2, a logic high is placed on DTE/DCE select control line 71 before the TX Tristate control line 80 is driven low. Thus, when pin 2 is driven, line 57 experiences a logic high, which results in line 71 being placed at a logic high. This enables receiver circuit 66 and driver circuit 60, and disables receiver circuit 62 and driver circuit 64. It also configures the computer system 10 as a DCE.

To configure driver/receiver circuit 42 to receive signals on pin 2 and to transmit signals on pin 3, a logic low is placed on DTE/DCE select control line 71 before driving TX Tristate control line 80 low. Thus, when pin 3 is driven, line 57 experiences a logic low, which results in line 71 being placed at a logic low. This enables receiver circuit 62 and driver circuit 64, and disables driver circuit 60 and receiver circuit 66. It also configures the computer system 10 as a DTE. TX tri-state signal 80 may be asserted at any time to place driver circuits 64 and 60 into a high impedance state regardless of the state of DTE/DCE select control line 71.

By incorporating the use of the above-described interface circuit, computer system 10 can automatically configure itself to communicate with either a DTE or DCE communications system using a single interface cable. Computer system 10 only has to monitor the signal on line 57, which indicates whether it is coupled to a DTE or a DCE communications system and then apply the appropriate signal in response on DTE/DCE select line 71 to configure itself as a DTE or DCE.

When the TX-Tristate control line 80 is driven high and the signal provided on line 57 is a logic low, it indicates that the computer system 10 is coupled to a DTE and that the computer system 10 has to configure itself as a DCE. Specifically, when line 57 is a logic low, the DTE/DCE select control line 71 provides a logic low signal to driver/receiver circuit 42, to configure driver/receiver circuit 42 to receive signals from pin 2 and to transmit data on pin 3.

Conversely, when the TX-Tristate control line 80 is driven high and the signal provided on line 57 is a logic high, it indicates that the computer system 10 is coupled to a DCE, and that the computer system has to configure itself as a DTE. Specifically, when line 57 is a logic high, DTE/ DCE select control line 71 provides a logic high to driver/ receiver circuit 42, to configure driver/receiver circuit 42 to receive signals from pin 3 and to transmit data on pin 2.

The configuration of the interface circuit of FIG. 2a does not require the use of any special cables or other user intervention. Additionally, the circuitry used to implement driver/receiver circuit 42 and DTE/DCE detection circuit 40 is relatively simple, and therefore these benefits can be provided at a relatively low cost. When no other system is coupled to computer system 10, pins 2 and 3 will be at the same voltage level, which causes the output of voltage comparator circuit 56 to go, by default, to a logic high DTE configuration because of the 0.5 volt source offset 54. This allows the interface circuit of FIG. 2a to be at a known state when no other communications circuit is coupled to computer system 10.

Figure 2B:
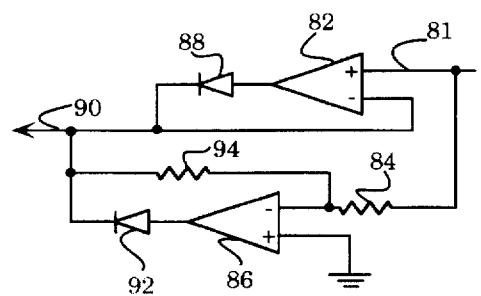
FIG. 2b depicts a circuit diagram of an absolute value circuit used in the first embodiment of the invention.

FIG. 2b is a detailed schematic diagram of one embodiment of the absolute value circuit 50 or 52 used in the present invention. The input signal placed on input node 81 is applied directly to the noninverting input of differential amplifier 82, and after passing through resistor 84 to the inverting input of differential amplifier 86. The outputs of differential amplifiers 82 and 86 are applied through diodes 88 and 92 respectively to output node 90. The output at node 90 is fed back directly to the inverting input of differential amplifier 82, and to negative input of differential amplifier 86 after passing through resistor 94. The positive input of differential amplifier 86 is coupled to ground.

When the voltage level on input node 81 is above ground, differential amplifier 82 asserts a signal with the same voltage level through diode 88 onto output node 90. Differential amplifier 86 asserts a negative voltage in response to a positive voltage level on input node 81, but diode 92 becomes back-biased in response to this negative voltage, preventing it from being applied to output node 90. When the voltage level on input node 81 is below ground, differential amplifier 86 asserts a positive voltage of the same magnitude on output node 90 through diode 92. Differential amplifier 82 will assert a negative voltage in response to a negative voltage on node 81, but diode 88 becomes back-biased in response to this negative voltage, preventing it from affecting output node 90. Thus, the absolute value circuit shown places the absolute value of the voltage level placed on input node 81 onto output node 90.

Figure 3:
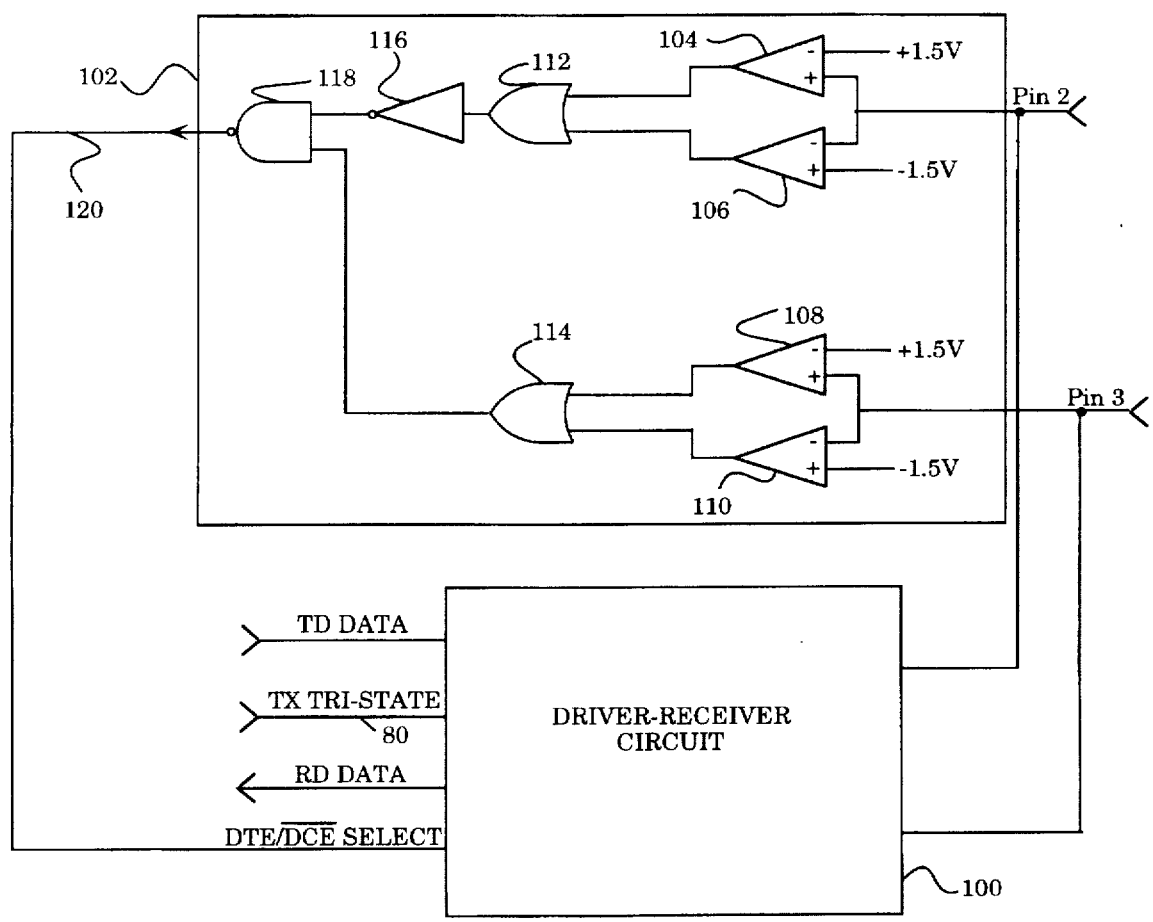
FIG. 3 depicts a circuit diagram of an interface circuit configured in accordance with a second embodiment of the invention.

FIG. 3 is a circuit diagram of an interface circuit used with computer system 10 when configured in accordance with a second embodiment of the present invention. Driver/ receiver circuit 100 is identical to driver/receiver circuit receiver 42 of FIG. 2a and during operation is also coupled to pin 2 and pin 3 of the cable connector placed at one end of cable 12 (shown in FIG. 1) when in operation. DTE/DCE detection circuit 102 comprises voltage comparators 104 and 106, which have their respective noninverting and inverting inputs coupled to pin 2 of the RS-232 cable connector, and voltage comparators 108 and 110, which have their respective noninverting and inverting inputs coupled to pin 3. A positive 1.5 volt voltage source is applied to the inverting inputs of voltage comparators 104 and 108 and a negative 1.5 volt voltage source is applied to the noninverting inputs of voltage comparators 106 and 110. OR gate 112 receives the outputs of voltage comparators 104 and 106 and asserts a signal to inverter 116 in response. The output of inverter 116 is then applied to NAND gate 118. OR gate 114 receives the output of voltage comparators 108 and 110 and applies the result directly to NAND gate 118. The output of NAND gate 118 is applied to the DTE/ DCE select control line 120 of driver/receiver circuit 100.

During operation, voltage comparators 104 and 106 monitor the voltage level on pin 2. When the voltage level on pin 2 is greater than 1.5 volts, voltage comparator 104 asserts a logic high. Similarly, when the voltage level on pin 2 is less than negative 1.5 volts, voltage comparator 106 also asserts a logic high. Either of these logic highs will cause OR gate 112 to assert a logic high that is received by inverter 116, which will in turn assert a logic low that is received by NAND gate 118. Similarly, voltage comparators 108 and 110 will each assert a logic high when the voltage level on pin 3 is greater than 1.5 volts or less than negative 1.5 volts respectively. When either voltage comparator 108 or 110 asserts a logic high, OR gate 114 will provide a logic high to NAND gate 118.

As described earlier, the RS-232 interface standard provides that a pin driven by another communications system will experience a voltage level with a value greater than 3 volts or less than 3 volts while a non-driven pin will experience a voltage level of zero. Therefore, if the TX-Tristate control line 80 is driven high and pin 2 is driven by another communications system, voltage comparators 104 and 106 will assert a logic high, causing OR gate 112 to assert a logic high. This signal is inverted by inverter 116 which applies a logic low to NAND gate 118. When pin 3 is coupled to the receiver circuit and pin 2 to the driver circuit of another communications system, OR gate 114 will assert a logic high. The logic low from inverter 118 and logic high from gate 114 will cause NAND gate 118 to assert a logic high on DTE/DCE control line 120, indicating that the interface circuit 102 is coupled to a DCE.

When pin 3 is driven and pin 2 is coupled to the receiver input of another communications system and TX-Tristate control line 80 is high, OR gate 112 will assert a logic high which is inverted by inverter 116 to provide a logic low. In addition, OR gate 114 will assert a logic high when pin 3 is driven. These logic highs will cause NAND gate 118 to assert a logic low on DTE/DCE line 120 indicating the interface circuit 102 is coupled to a DTE. When DTE/DCE detection circuit 102 is not coupled to another communications system, NAND gate 118 will receive a logic low from inverter 118 and a logic high from gate 114, causing it to asset a default logic high on DTE/DCE control line 120.

As with the interface circuit of FIG. 2a, when computer system 10 of FIG. 1 is configured with the interface circuit of FIG. 3, it can automatically configure itself to communicate with a either DTE or a DCE communications system using the same cable. When the interface circuit of FIG. 3 is coupled to DCE, pin 2 will be driven and pin 3 will be coupled to a receiver circuit. As described above, this will cause DTE/DCE line 120 to be asserted high, properly indicating that the interface circuit is coupled to a DCE system. Since DTE/DCE select line 120 is coupled to DTE/ DCE select input of driver/receiver circuit 100, when the TX-Tristate control line 80 is driven low the driver/receiver circuit 100 will be configured to receive signals over pin 3 and to transmit signals over pin 2. In this manner, computer system 10 will be configured as a DTE.

When the interface circuit of FIG. 3 is coupled to a DTE, pin 2 will be coupled to a receiver circuit and pin 3 will be driven. This will place DTE/DCE control line 120 at a logic low, which will in turn configure driver/receiver circuit 100 to receive data on pin 2 and to transmit data on pin 3 when the TX-Tristate control line 80 is driven low. In this manner, computer system 10 will be configured as a DCE. Thus, the circuit in FIG. 3 configures itself to communicate with either a DTE or a DCE communications system without the need for special cables or for special user interaction. Additionally, as with the interface circuit of FIG. 2, when neither pin 2 nor pin 3 is coupled to another system, gates 112 and 114 will be at logic lows. Inverter 116 asserts a logic high in response to the logic low from gate 112. The logic low signal from inverter 116 and logic high from gate 114 cause NAND gate 118 to assert a logic high. As a result, the interface circuit will be defaulted to a DTE configuration and will therefore be in a known state.

Figure 4:
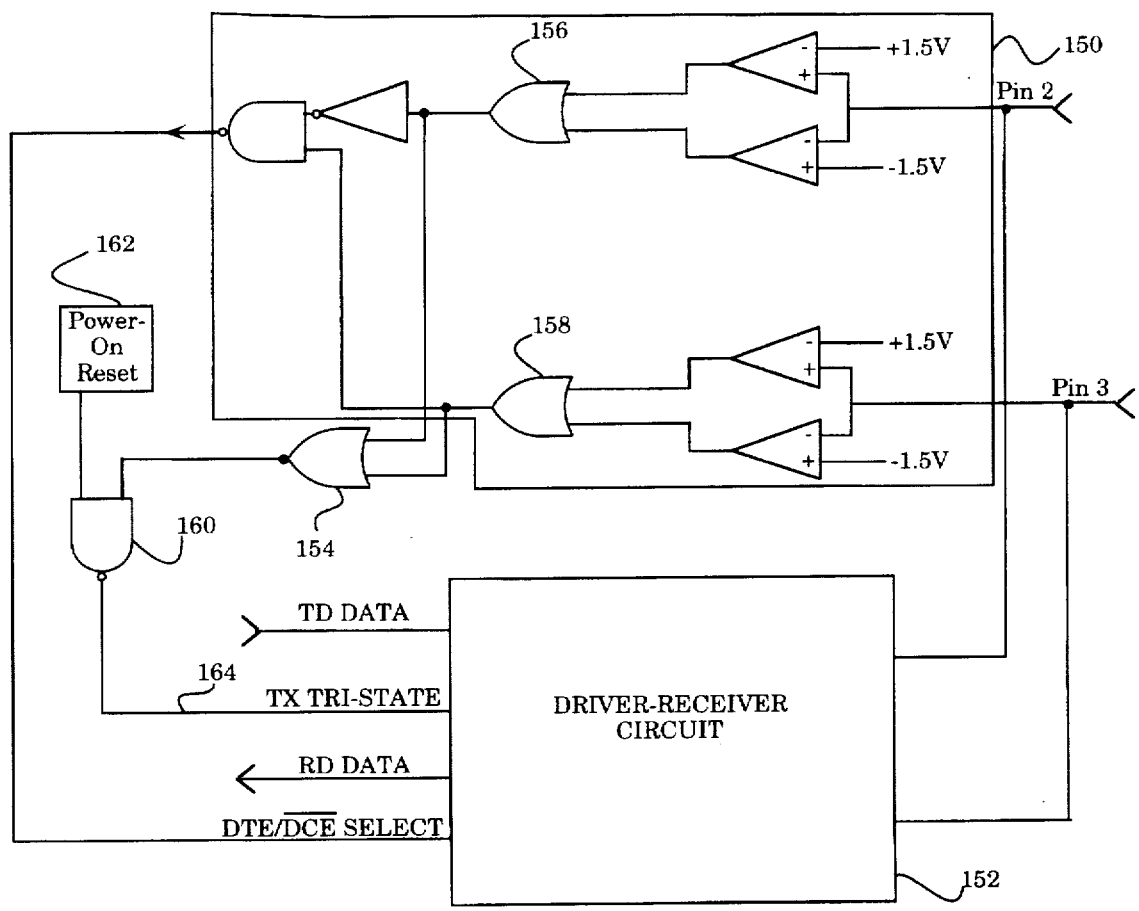
FIG. 4 depicts a circuit diagram of an interface circuit configured in accordance with a third embodiment of the invention.

FIG. 4 is a circuit diagram illustrating the interface circuit used by computer system 10 when configured in accordance with a third embodiment of the invention. DTE/DCE detection circuit 150 is identical to the DTE/DCE detection circuit 102 shown in FIG. 3 and driver receiver circuit 152 is identical to driver receiver circuit 100, also shown in FIG. 3.

The effect of the additional circuitry incorporated into the interface circuit shown in FIG. 4 beyond that shown in FIG. 3, is to hold the outputs of driver/receiver circuit 152 at a high impedance state when neither pin 2 nor pin 3 is coupled to the driver circuit of another communications system. In particular, power-on reset circuit 162 asserts a logic low for 100 milliseconds after power is first applied to the circuit and then asserts a logic high for so long as power remains applied. Its output is applied as one input to NAND gate 160. NOR gate 154 is coupled to the outputs of OR gates 156 and 158 of DTE/DCE detection circuit 150. The output of NOR gate 154 is then applied as a second input to NAND gate 160. NAND gate 160 then asserts a signal on tri-state TX driver line 164 in response.

When neither pin 2 nor pin 3 are driven, OR gates 156 and 158 will both assert logic lows, which are received by NOR gate 154. This will cause NOR gate 154 to assert a logic low which, when combined with the logic high from power-on reset circuit 162, places tri-state TX driver signal 164 at a logic high, causing the outputs of driver receiver circuit 152 to enter a high impedance state. By placing the outputs of driver/receiver circuit at a high impedance state, the decision as to whether the circuit is to be configured as a DTE or a DCE is delayed until a voltage is applied to either pin 2 or pin 3. In addition, the logic low asserted by power-on reset circuit 162 during power-up will cause tri-state TX driver line 164 to become a logic high during power-up, thus placing the outputs of driver receiver circuit 152 at a high impedance state. This prevents unpredictable interaction from taking place between the described interface circuit and another communications system during the power up sequence.

Thus, an interface circuit that determines the configuration of the communications system to which it is coupled, and which can automatically configure itself to transmit or receive data in response, is described. It will be apparent to those skilled in the art that alternative embodiments of the invention other than the one described above are possible. The implementation described above is intended only to serve as an example, and should not be construed as limiting the scope of the invention.

What is claimed is:

1. A communications interface circuit adapted to a connector of a serial communication cable operating in accordance with RS-232 communication standards, comprising:

a detection circuit to detect if one of a first pin and a second pin of the connector is being driven, said detection circuit placing a control signal in a first state if an absolute value of a voltage level on said first pin is greater than an absolute value of a voltage level on said second pin, and in a second state if said voltage level on said first pin is less than said voltage level on said second pin; and a driver/receiver circuit coupled to the detection circuit, said driver/receiver circuit to automatically configure (i) said first pin to receive data in response to receiving said control signal in said first state, and (ii) said second pin to receive data in response to receiving said control signal in said second state.

2. The communications interface circuit as set forth in claim 1, wherein said detection circuit is coupled to said first and second pins which are respectively coupled to a receive data signal line and a transmit data signal line of the serial communication cable.

3. The communications interface circuit as set forth in claim 1, wherein said detection circuit comprises:

first absolute value circuit for generating a first voltage level equal to the absolute value of the voltage on said first pin;

second absolute value circuit for generating a second voltage level equal to the absolute value of the voltage level on said second pin; and voltage comparator for comparing said first voltage level with said second voltage level.

4. The communications interface circuit as set forth in claim 3, wherein said driver/receiver circuit comprises:

first receiver circuit, coupled to said first pin, for receiving a first signal;

first driver circuit, coupled to said first pin, for generating a second signal; and signal line for enabling one of said receiver circuit and said driver circuit.

5. The communications interface circuit as set forth in claim 3, wherein said driver/receiver circuit comprises:

first receiver circuit coupled to said first pin, said first receiver circuit receiving a first input signal;

second receiver circuit coupled to said second pin, said second receiver circuit receiving a second input signal;

first driver circuit coupled to said first pin, said first driver circuit transmitting a first output signal;

second driver circuit coupled to said second pin, said first driver circuit transmitting a second output signal; and signal line for enabling either said first receiver circuit and said second driver circuit, or said second receiver circuit and said first driver circuit.

6. The communications interface circuit as set forth in claim 1, wherein said detection circuit comprises:

a first voltage detection circuit for detecting if said first pin is within a predetermined voltage range; and a first OR gate for asserting a first signal in response to said first voltage detection circuit.

7. The communications interface circuit as set forth in claim 6, wherein said detection circuit further comprises:

a second voltage detection circuit, in parallel with the first voltage detection circuit, for detecting if said second pin is within said predetermined voltage range;

a second OR gate for asserting a second signal in response to said second voltage detection circuit; and a NAND gate responsive to said first signal and said second signal.

8. The communications interface circuit as set forth in claim 7, wherein said driver/receiver circuit comprises:

first receiver circuit, coupled to said first pin, for receiving an input signal;

first driver circuit, coupled to said first pin, for generating an output signal; and signal line for enabling and disabling said first receiver circuit and said first driver circuit.

9. The communications interface circuit as set forth in claim 6, wherein said driver/receiver circuit comprises:

first receiver circuit, coupled to said first pin, for receiving a first input signal;

second receiver circuit, coupled to said first pin, for receiving a second input signal;

first driver circuit, coupled to said second pin, for transmitting a first output signal;

second driver circuit, coupled to said second pin, for transmitting a second output signal; and means for enabling either said first receiver circuit and said second driver circuit, or said second receiver circuit and said first driver circuit.

10. The communications interface circuit as set forth in claim 9, further comprising:

means for placing said driver/receiver circuit into a high impedance state in response to said detection circuit.

11. The circuit as set forth in claim 10, wherein said means for placing comprises:

a power-on reset circuit for generating a power-on reset signal;

a NOR gate for asserting a network status signal in response to said power-on reset circuit; and a NAND gate for asserting a tri-state signal in response to said power-on reset signal and said NOR gate.

12. A communications interface circuit adapted to a connector of a serial communication cable operating in accordance with RS-232 communication standards, comprising:

detector means for detecting if one of a first pin and a second pin of the connector is being driven, said detector means includes means for generating (i) a control signal in a first state if an absolute value of a voltage level on said first pin that is greater than an absolute value of a voltage level on said second pin, and (ii) the control signal in a second state if a voltage level on said first pin that is less than a voltage level on said second pin; and driver/receiver means for automatically configuring said one pin to receive data in response to receiving said control signal in the first state from said detector means, said driver/receiver means being coupled to said detector means.

13. The communications interface circuit as set forth in claim 12, wherein said detector means is coupled to said first and second pins which are respectively coupled to a receive data signal line and a transmit data signal line of the serial communication cable.

14. The communications interface circuit as set forth in claim 12, wherein said detector means further comprises:

means for generating a first voltage level equal to the absolute value of a voltage on said first pin;

means for generating a second voltage level equal to the absolute value of a voltage on said second pin; and means for comparing said first voltage level with said second voltage level.

15. The communications interface circuit as set forth in claim 12, wherein said driver/receiver means comprises:

first receiver means, coupled to said first pin, for receiving a first signal;

first driver means, coupled to said first pin, for generating a second signal; and means for enabling one of said receiver means and said driver means.

16. The communications interface circuit as set forth in claim 12, wherein said driver/receiver means comprises:

first receiver means, coupled to said first pin, for receiving a first input signal;

second receiver means, coupled to said second pin, for receiving a second input signal;

first driver means, coupled to said first pin, for transmitting a first output signal;

second driver means, coupled to said second pin, for transmitting a second output signal; and means for enabling either said first receiver means and said second driver means, or said second receiver means and said first driver means.

17. The communications interface circuit as set forth in claim 12, wherein said detector means comprises:

first means for detecting when said first pin is within a predetermined voltage range; and first means for asserting a first Invalid signal in response to said first means for detecting.

18. The communications interface circuit as set forth in claim 17, wherein said detector means further comprises:

second means for detecting if said second pin is within said predetermined voltage range, said second means for detecting operating concurrently with said first means for detecting;

second means for asserting a second signal in response to said second means for detecting; and AND gate means responsive to said first signal and said second signal.

19. The communications interface circuit as set forth in claim 18, wherein said driver/receiver means comprises:

first receiver means, coupled to said first pin, for receiving a first signal;

first driver means, coupled to said first pin, for generating a second signal; and means for enabling and disabling said receiver means and said driver means.

20. The communications interface circuit as set forth in claim 17, wherein said driver/receiver means comprises:

first receiver means, coupled to said first pin, for receiving a first input signal;

second receiver means, coupled to said first pin, for receiving a second input signal;

first driver means, coupled to said second pin, for transmitting a first output signal;

second driver means, coupled to said second pin, for transmitting a second output signal; and means for enabling either said first receiver means and said second driver means, or said second receiver means and said first driver means.

21. The communications interface circuit as set forth in claim 20, further comprising:

means for placing said driver/receiver means into a high impedance state in response to said means for detecting.

22. The communications interface circuit as set forth in claim 21, wherein said means for placing comprises:

means for generating a power-on reset signal;

means for asserting a network signal in response to said means for detecting; and AND means for asserting a tri-state signal in response to said means for generating and said means for asserting.

23. A method for interfacing with a communications system utilizing serial communication links according to a RS-232 communication standard, the method comprising the steps of:

placing all drivers within an interface circuit of the communication system in a tri-state condition;

detecting if a first pin of the connector coupled to one of said serial communication links is being driven, said detecting step comprises the steps of generating a control signal in a first state when an absolute value of a voltage level on said first pin is greater than an absolute value of a voltage level on a second pin associated with said serial communication link, and alternatively generating said control signal in a second state when a voltage level on said first pin is less than a voltage level on said second pin; and automatically configuring the connector based on signaling by the interface circuit, to receive data on said first pin in response to detecting that said control signal is in the first state.

24. The method as set forth in claim 23, wherein prior to said detecting step, the method further comprises the steps of:

generating a first voltage level equal to the absolute value of the voltage level on said first pin;

generating a second voltage level equal to the absolute value of the voltage level on said second pin; and comparing said first voltage level with said second voltage level.

25. The method as set forth in claim 23, wherein said configuring step comprises the steps of:

receiving a first signal indicative of whether said first pin is driven, said first signal also indicative of whether said communications system is a receiving or a transmitting system;

generating a second signal in response to said first signal; and enabling a receiver circuit if said communications system is a transmitting system and enabling a driver circuit if said communications system is a receiving system.

26. The method as set forth in claim 25, wherein said enabling step comprises the step of:

enabling either a first receiver circuit and a second driver circuit both coupled to said first pin, or a second receiver circuit and a first driver circuit both coupled to a second pin.

27. The method as set forth in claim 23, wherein said configuring step comprises the steps of:

detecting if said first pin as within a predetermined voltage range; and asserting a first signal in response to said detecting step.

28. The method as set forth in claim 27, wherein said detecting step further comprises the steps of:

determining if said second pin is within said predetermined voltage range generally concurrent in time to detecting if said first pin is within the predetermined voltage range;

asserting a second signal in response to determining that said second pin is within said predetermined voltage range; and asserting a third signal in response to said first signal and said second signal.

29. The method as set forth in claim 28, wherein said asserting step comprises the step of:

enabling either a receiver circuit or a driver circuit.

30. The method as set forth in claim 27, wherein said configuring step further comprises the step of:

enabling either a first receiver circuit and a second driver circuit coupled to said first pin, or a second receiver circuit and a first driver circuit coupled to a second pin.

31. The method circuit as set forth in claim 30, further comprising the step of placing said driver/receiver circuit into a high impedance state in response to said detecting step.

32. The method as set forth in claim 31, wherein said placing step comprises the steps of:

generating a power-on reset signal;

asserting a network signal in response to said generating step; and asserting a tri-state signal in response to said generating step and said asserting step.

33. An apparatus coupled to a remotely located device through a network, including a connector coupled to at least one serial communication cable operating in accordance with a RS-232 communication standard, for automatically switching to operate as a Digital Terminal Equipment (DTE) device or a Digital Communications Equipment (DCE) device depending on whether the remotely located device operates as a DTE or DCE device, comprising:

an indicator circuit to detect if a first pin of the connector is being driven, and to generate a control signal in a first state indicating that the remotely located device operates as said DCE device; and a driver/receiver circuit coupled to the indicator circuit, said driver/receiver circuit to receive the control signal in the first state, and in response, to configure the apparatus to operate as a DTE device upon receiving the control signal in the first state from said indicator circuit.

34. The apparatus as set forth in claim 33, wherein said indicator circuit comprises:

absolute voltage level comparison circuit to generate the control signal (i) in the first state if an absolute value of a voltage level on said first pin that is greater than an absolute value of a voltage level on a second pin, and alternatively (ii) in a second state if a voltage level on said first pin is less than a voltage level on said second pin.

35. The apparatus as set forth in claim 34, wherein said absolute voltage level comparison circuit comprises:

first absolute value circuit to generate a first voltage level equal to the absolute value of the voltage on said first pin;

second absolute value circuit to generate a second voltage level equal to the absolute value of the voltage level on said second pin; and voltage comparator to compare said first voltage level with said second voltage level.

36. The apparatus as set forth in claim 35, wherein said driver/receiver circuit comprises:

first receiver circuit, coupled to said first pin, to receive a first signal;

first driver circuit, coupled to said first pin, to receive a second signal; and signal line to enable one of said receiver circuit and said driver circuit.

37. The apparatus as set forth in claim 35, wherein said driver/receiver circuit comprises:
  first receiver circuit coupled to said first pin, said first receiver circuit to receive a first input signal;
  second receiver circuit coupled to said second pin, said second receiver circuit to receive a second input signal;
  first driver circuit coupled to said first pin, said first driver circuit to transmit a first output signal;
  second driver circuit coupled to said second pin, said second driver circuit to transmit a second output signal; and
  signal line to enable either said first receiver circuit and said second driver circuit, or said second receiver circuit and said first driver circuit.

38. The apparatus as set forth in claim 34, wherein said indicator circuit comprises:
  a first voltage detection circuit to detect if said first pin of the connector is within a predetermined voltage range; and
  a first OR gate to assert a first signal in response to said first voltage detection circuit.

39. The apparatus as set forth in claim 38, wherein said indicator circuit further comprises:
  a second voltage detection circuit, in parallel with the first voltage detection circuit, to detect if a second pin of the connector is within said predetermined voltage range;
  a second OR gate to assert a second signal in response to said second voltage detection circuit; and
  AND gate means to respond to said first signal and said second signal.

40. The apparatus as set forth in claim 39, wherein said driver/receiver circuit comprises:
  first receiver circuit, coupled to said first pin, to receive a first signal;
  first driver circuit, coupled to said first pin, to generate a second signal; and
  signal line to enable and disable said first receiver circuit and said first driver circuit.

41. The apparatus as set forth in claim 38, wherein said driver/receiver circuit comprises:
  first receiver circuit, coupled to said first pin, to receive a first input signal;
  second receiver circuit, coupled to said first pin, to receive a second input signal;
  first driver circuit, coupled to said second pin, to transmit a first output signal;
  second driver circuit, coupled to said second pin, to transmit a second output signal; and
  means for enabling either said first receiver circuit and said second driver circuit, or said second receiver circuit and said first driver circuit.

42. The apparatus as set forth in claim 41, further comprising:
  a first signal line to place said driver/receiver circuit into a high impedance state in response to said detection circuit.

43. The apparatus as set forth in claim 42, wherein said means for placing comprises:
  a power-on reset circuit to generate a power-on reset signal;
  a NOR gate to assert a network signal in response to said means for detecting; and
  NAND means for asserting a tri-state signal in response to said power-on reset signal and said NOR gate.

44. A communications interface circuit of a connector coupled to a serial communication cable to automatically configure a pin protocol of the connector, the communications interface circuit comprising:
  a detection circuit to detect if said communications interface circuit is coupled to a Digital Communications Equipment (DCE) device or a Digital Terminal Equipment (DTE) device by comparing absolute values of voltage levels on at least a first and second pins of the connector, and to generate a control signal in a first state if coupled to a DCE device and in a second state if coupled to a DTE device; and
  a driver/receiver circuit coupled to the detection circuit, said driver/receiver circuit to receive data through said second pin upon receiving the control signal in the second state and to transmit data through said second pin upon receiving the control signal in the first state.

* * * * *

UNITED STATES PATENT AND TRADEMARK OFFICE
CERTIFICATE OF CORRECTION

PATENT NO.   : 5,761,463
DATED        : June 2, 1998
INVENTOR(S)  : Charles M. Allen It is certified that error appears in the above-identified patent and that said Letters Patent is hereby corrected as shown below:

<u>Column 6,</u>
Line 23, delete "3" and insert -- -3 --.
Line 38, delete "logic high" and insert -- logic low --.
Line 39, delete "logic low" and insert -- logic high --.

Signed and Sealed this

Third Day of September, 2002

Attest:

Attesting Officer

JAMES E. ROGAN
Director of the United States Patent and Trademark Office